Sept. 4, 1956         A. A. OBERMAIER ET AL         2,761,976
        METHODS AND APPARATUS FOR MEASURING QUANTITATIVELY
                    THE AMOUNT OF GAS IN A MIXTURE
Filed April 17, 1951                                 3 Sheets-Sheet 1

INVENTORS.
Alfred A. Obermaier &
Bruce A. Ritzenthaler
By: Robert H. Wendt
                Atty.

Sept. 4, 1956  A. A. OBERMAIER ET AL  2,761,976
METHODS AND APPARATUS FOR MEASURING QUANTITATIVELY
THE AMOUNT OF GAS IN A MIXTURE
Filed April 17, 1951  3 Sheets-Sheet 2
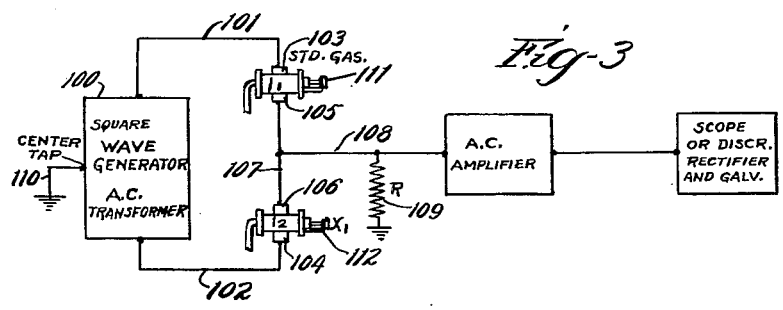
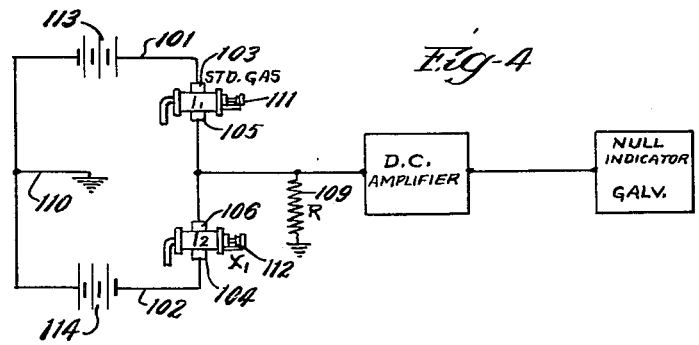
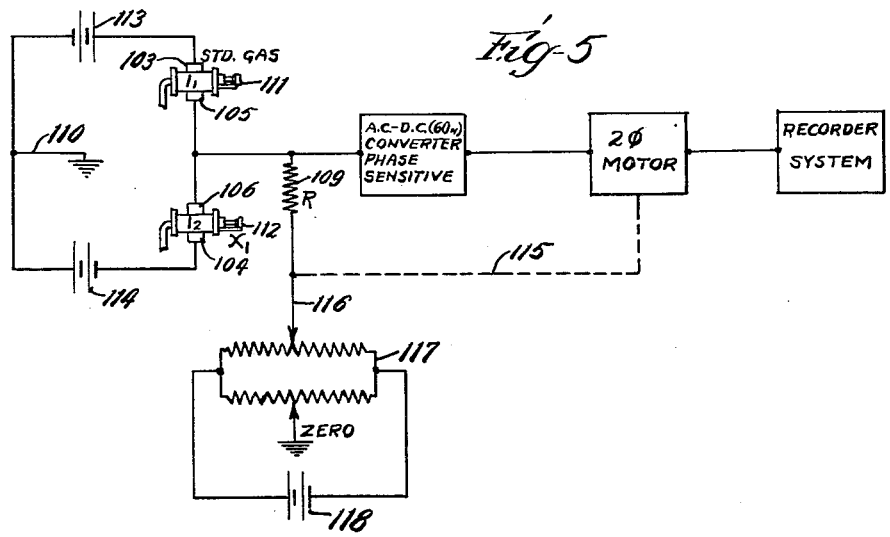
INVENTORS.
Alfred A. Obermaier +
Bruce A. Ritzenthaler
By:- Robert H. Wendt
Atty.

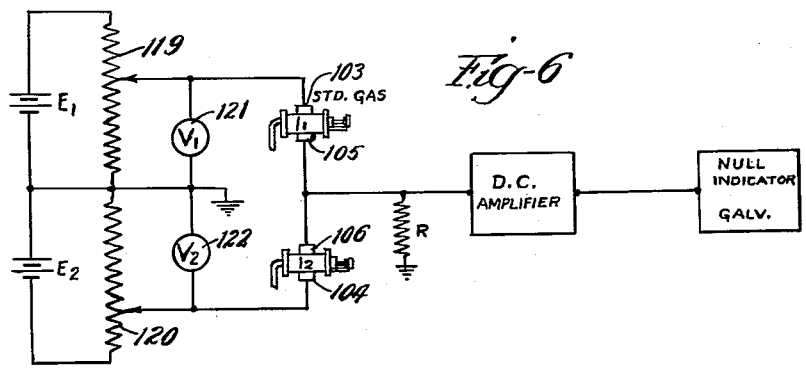
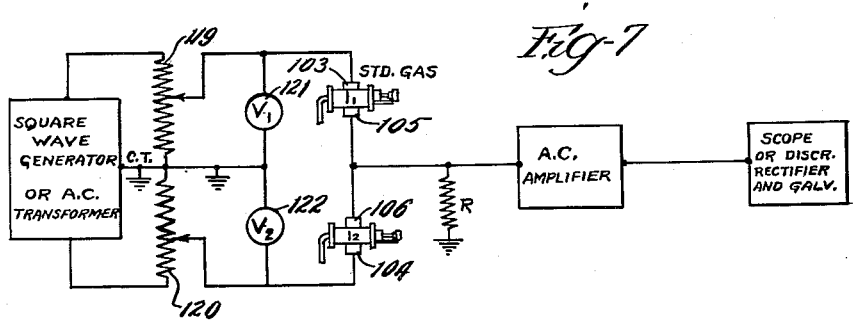

United States Patent Office 2,761,976
Patented Sept. 4, 1956

1

2,761,976

METHODS AND APPARATUS FOR MEASURING QUANTITATIVELY THE AMOUNT OF GAS IN A MIXTURE

Alfred A. Obermaier, Park Ridge, and Bruce A. Ritzenthaler, Chicago, Ill., assignors to Illinois Testing Laboratories, Inc., Chicago, Ill., a corporation of Illinois Application April 17, 1951, Serial No. 221,452

26 Claims. (Cl. 250—43.5)

The present invention relates to methods and apparatus for measuring quantitatively the amount of gas in a mixture, and is particularly concerned with effecting such a measurement by comparison with a standard.

One of the objects of the invention is the provision of an improved method of comparing the amount of gas in a mixture with a standard by relative adjustment of electrodes bearing radium, the radium ionizing the gas in both cells, and the position of the adjustable electrode indicating the amount of gas in the mixture.

Another object of the invention is the provision of an improved device for measuring gases which includes a standard chamber for a standard gas and a test chamber for the gas mixture in which the gases are measured by measuring the amount of ionization current that passes between electrodes in each chamber.

Another object of the invention is the provision of an improved device for measuring gases including a chamber for the gas to be measured, in which the ionization is controlled and measured by adjusting the position of a radium source that increases or decreases ionization.

Another object is the provision of a gas comparing device, in which the gas in a mixture is compared with a standard, producing an unbalanced signal which is impressed on a two-phase motor through an amplifier, the motor driving and adjusting the position of a radium source which is adapted to control ionization and thereby to effect a balance of the circuit, while at the same time giving an indication of the amount of gas in the mixture.

Another object is the provision of an improved method of measuring the gas in a mixture which comprises applying an out-of-phase signal to the plates of two comparison ionization chambers, acting as grids to compare the differences in current output.

Another object is the provision of an improved measuring device for measuring the amounts of gas in a mixture, which can also be used for measuring the dewpoint of gases.

Another object is to provide a plurality of selective instrumentation systems to be utilized with such a gas analyzer to accomplish specific new and useful results.

Other objects and advantages of the invention will be apparent from the following description and the accompanying drawings, in which similar characters of reference indicate similar parts throughout the several views.

Referring to the three sheets of drawings accompanying the specification,

Fig. 1 is a diagrammatic illustration including a wiring circuit embodying the invention;

Fig. 2 is a larger sectional view, taken on a plane passing diametrically through the cylindrical chamber, showing the details of construction of one of the comparison chambers;

Fig. 3 is a wiring diagram showing an alternative system of connecting the gas chamber electrodes in circuit and utilizing a square wave energization at the transformer to secure more uniform results;

2

Fig. 4 is another diagrammatic illustration of an alternative system energized by batteries;

Fig. 5 is another wiring diagram, showing a third modified system for recording the impurity gas concentration;

Fig. 6 shows another wiring diagram of a modified system utilizing batteries for energization with a potentiometer and volt meters for indicating gas concentration on a calibrated volt meter scale;

Fig. 7 is another wiring diagram of an improved system similar to Fig. 6, except that a square wave generator is used for energization, the impurity gas concentration being read on a volt meter scale.

Referring to Fig. 1, 10 indicates an energizing transformer, the primary 11 of which is preferably adapted to be connected to a 110 volt A. C. source. The secondary 12 is connected by conductors 13 and 14 to two of the electrodes 15, 16 of the gas comparison chambers 17, 18. The other electrodes 19 and 20 are joined by conductor 21 and preferably connected through a resistor 22 to ground at 23.

The resistor 22, for example, may have a resistance of approximately 80 megohms. The transformer secondary 12 is preferably provided with a mid point ground 24. The two gas comparison chambers 17 and 18 may be substantially similar in construction; but one, such as No. 17, is used as a standard cell, while the other one, No. 18, is used as a test cell.

Referring to Fig. 2, this is an axial sectional view, taken through the test cell 18, and showing the details of its construction. The test cell may consist of a substantially cylindrical metal housing 25, the ends of which have radial flanges 26 and 27 for receiving the end covers 28, 29, which may be secured by a plurality of screw bolts 30 to provide a gas-tight closure. The seating surfaces are suitably ground and fitted for this purpose.

The cover 28 has a threaded inlet bore 31 for receiving the inlet pipe 32. The cylindrical housing 25 may have a threaded outlet bore 33 for the outlet pipe 34. The housing 25 is provided with a pair of diametrically opposite apertures 35, 36, within which are secured the metal tubes 37, 38 provided with covers 39, 40, which serve as supports and enclosures for the adjustable electrodes 16 and 20.

The covers 39 and 40 may each be threaded into the ends of tubes 37 and 38 and may have an annular sealing flange 41 engaging the end of each tube. The covers 39 and 40 are preferably made of plastic insulating material, such as "Teflon."

The electrodes 16 and 20 may be carried by threaded screw bolts 42, 43 having reduced riveted ends 44 passing through a central aperture in each of the electrodes 16 and 20 and riveted over. The electrodes may consist of circular discs with rearwardly turned cylindrical flanges 45.

Each of the bolts 42, 43 has a kerf 46 for receiving a screwdriver, whereby the electrode positions may be adjusted. This permits the adjustment of the electrodes to balance their capacity and to eliminate the signal which would result from unbalance.

The housing 25 is preferably provided at a point just inside the inlet 31 with a diffuser screen 47, comprising a fine copper screen, such as, for example, 80 mesh per square inch, for assuring a uniform mixture of gases which pass into the test cell.

The metal housing of the test cell serves as a shield for the ionized gases. The cover 29 is provided with a cylindrical bore 48 for passing an adjustable supporting rod 49, by means of which a suitable insulating support 50 for a radioactive material may be carried in the chamber adjacent the electrodes and adjusted to a suitable position.

The rod 49 carries an integral cylindrical radial flange 50, which is rotatably mounted between a pair of insulating gasket seals 51, 52, which may be made of "Teflon" or other high dielectrical material. The gasket seals 51, 52 are like a washer in shape, having a central bore for passing the rod 49, and having a size suitable to be received in a cylindrical bore 53 in the cover 29.

The cover 29 has its bore 53 provided with a second cover 54 secured in place by a plurality of threaded screw bolts 55, which are threaded into the cover 29. The auxiliary cover 54 also has a cylindrical bore for guiding the rod 49. The cover 29 also carries a pair of inwardly extending guide pins 56 located on opposite sides of the rod 49 and mounted in bores 57 in the cover 29.

The pins 56 extend into or through cylindrical bores 58 in the supporting member 50, which also has a threaded bore 59 for receiving the threaded end 60 of the rod 49. When the rod 49 is rotated in a clockwise direction, it tends to be threaded into the bore 59; but as the rod is mounted against axial movement, it causes the supporting member 50 to move longitudinally on the rod like a follower. Rotation of the supporting member 50 is prevented by pins 56.

The supporting member 50 may consist of an insulating disc, which is covered with gold foil and then provided with a radioactive material, such as radium. The radium is rhodium plated to protect it and to provide a gas seal.

The housing 25 is provided at its right end, parallel to the rod 49, with a longitudinally extending metal scale member 61, which is beveled at its right end to provide a pointer end 62. The scale 61 at its right end may be soldered or brazed to the housing cover 29.

It preferably extends with its flat body in a radial direction with respect to the center of the rod 49. In addition to the threaded end 60 of rod 49, it has another threaded portion 63, extending from the cover 54 to the actuating knob 64, for driving a follower 65.

The follower 65 may be a rectangular block with a threaded bore 66 and with a slot 67 for sliding on the scale 61. The follower 65 may consist of two halves clamped on the rod 49 by means of screw bolts 68; and the follower 65 preferably has a pointer 69, which points to scale divisions on the scale 61 and indicates the general position of the radium supporting member 50.

The position of this member is more accurately indicated by the actuating knob 64, which has a cylindrical body 70 with a scale which rotates under the pointer 62 and gives a micrometer indication of the adjustments. The knob 64 is fixedly secured to the rod 49 by means of a through pin 71.

Referring again to Fig. 1, when the conditions in both gas analyzing chambers are similar, the circuit is balanced and there is no current flowing through the resistance 22 to ground. When the conditions are unbalanced, there is a signal impressed upon the resistance 22; and this signal may be impressed upon an amplifying circuit, such as is included in the dash line rectangle and indicated by the numeral 72.

Any number of amplifying stages, as shown in Fig. 1, at 72, may be employed; and the output of this amplifier may be connected to an oscilloscope or to the control mounting of a two phase motor or any other suitable indicating instrument, or all of them.

When the two phase motor is employed, it would be connected to drive the actuating knob 64 or the rod 49, the rotation of the rod 49 moving the radium supporting member 50 back to a condition of balance. The oscilloscope would show the wave form of the signal, which disappears and becomes a straight line when the circuit through the analyzer chambers is again balanced.

For example, the conductor 73 may lead from the upper end of resistance 22, in Fig. 1, through a resistance 74 to the control grid 75. 76 indicates the suppressor grid, and 77 indicates the screen grid. One plate of the tube indicated at 78 is connected by conductor 79 through condenser 80 to one of the output terminals 81. The other plate 82 is connected through resistance 83 to ground at 84.

A condenser 85 is bridged across the resistance 83. The screen grid 77 is connected through a resistance 85′ to a conductor 86. The conductor 86 is connected to a D. C. source 87, such as 300 volts D. C., the other terminal of which is connected to conductor 88. Conductor 88 leads to ground 84 and to the other output terminal 89. Another resistance 90 is connected between conductor 86 and conductor 79.

A trimmer or balancing condenser 91 is preferably bridged around the standard cell electrodes 15 and 19. The value of the resistance 74 may, for example, be about ten megohms.

The operation of the present device and circuit is as follows:

When both of the comparison chambers 17 and 18 are filled with the same gas, such as, for example, air, and the circuit is balanced by proper adjustment of the radium bearing members 50 in each case, there will be no signal impressed upon the resistance 22 at the output; and the oscillograph will show a straight line. Upon the passing of another gas into the test chamber 18, this produces an unbalance, as follows:

The amount of current passing from electrode 16 to 20 depends on the concentration of gas and also depends upon the position of the radium supporting member. The amount of current depends upon the ionization of the gas; and the ionization can be increased by bringing the radium supporting member 50 closer to the electrodes 16 and 20; or ionization can be decreased by moving the radium supporting member 50 away from the vicinity of the gas between the plates 16 and 20.

The amount of movement which is required to bring the circuit back to a balance is an indication of the amount of foreign gas in the test cell, which can be read by reading the scale 61 at pointer 69 and the scale 70 at pointer 62.

A table of values, which is provided with micrometer readings for the particular amount of gas concentration, is provided with the instrument for each particular gas; and thus it is possible to measure quantitatively the amount of a particular gas in any mixture.

Referring to Fig. 3, this is a wiring diagram of a modification in which a square wave generator may be employed. The square wave generator, indicated at 100, has its output terminals 101, 102 connected to the electrodes 103 and 104 of the standard gas chamber and the test gas chamber.

The other two electrodes 105 and 106 are joined by a conductor 107 having a center tap conductor 108 leading to a grounded resistance 109. The square wave generator has a center tap grounded as indicated at 110.

The position of the radium foil support carried by a shaft having a calibrated knob 111 is then so adjusted until there is a straight line shown on the oscilloscope or, if a galvanometer is used, until there is a zero reading.

The concentration of impurity gas is then read upon the calibrated radium supporting screw 112, also indicated as $X_1$.

The A. C. amplifier has its signal input connected to the voltage impressed across the resistance 109; and the output of the A. C. amplifier may be connected to an oscilloscope or to a discriminating rectifier and galvanometer.

Referring to Fig. 4 this shows an alternative circuit for the instruments in which the same electrodes are energized by means of direct current supplied by batteries 113, 114. The same grounded system is employed; and the same resistance 109 and the output of the D. C. amplifier is impressed upon a null indicator, such as a galvanometer.

In this case the radium supporting screw 112 is again so adjusted that there is a zero reading on the galvanometer; and the concentration of impurity gas is read on the calibrated screw 112 of the test chamber.

Referring to Fig. 5, this is another wiring diagram of a modification in which electrodes are again energized by batteries; and the output is impressed upon an A. C. D. C. 60 cycle phase sensitive converter.

The output of the converter is impressed upon a two-phase motor which drives a recorder system; but the motor is mechanically connected, as indicated by the dotted line 115, to the movable contact 116 of the potentiometer 117, which is also energized by means of a battery 118.

In this case the motor constantly drives the movable contact 116 of the potentiometer 117 back to a balanced condition; but the impurity gas concentration can be recorded and read on the recorder scale (by calibration) for a given setting of the radium supporting electrode 112.

Referring now to Fig. 6, this is a wiring diagram of another modification which is battery energized by means of a potentiometer 120. The radium foil in this case is maintained in fixed position in both gas chambers. The same electrodes are energized from the potentiometer at 119 and 120; and the output is impressed upon a D. C. amplifier and a null indicator, such as a galvanometer.

The two volt meters are indicated at 121, 122 as indicating the voltage impressed upon the two potentiometer sections. For any given value of the voltage at volt meter 121 and a given impurity gas in the lower of the two chambers the voltage at $V_2$ or 122 is adjusted to produce a zero reading on the galvanometer. Then the impurity gas concentration may be read from a calibrated scale on volt meter 122.

The same system can be used with a recorder, as described with respect to Fig. 5.

Referring to Fig. 7, this is a wiring diagram of a system similar to Fig. 6 with both radium foil electrodes in a fixed position; but it is energized by means of a potentiometer and a square wave generator or an A. C. transformer.

In this case the output is impressed upon an A. C. amplifier and its output upon an oscilloscope or discriminating rectifier and galvanometer.

For a given value of $V_1$ and a given impurity gas in the lower or test chamber the voltage on $V_2$ is adjusted by moving the potentiometer contact until the galvanometer or oscilloscope shows a zero reading. Then the impurity gas concentration may be read from a calibrated scale on $V_2$.

The above circuit of Fig. 7 may also be used in a recorder system.

It will thus be observed that we have invented an improved device and circuit for measuring quantitatively mixtures of gas to find out how much of each gas there is in the mixture. This is done by comparing the gas mixtures to be tested with a standard gas in a similar ionization chamber.

The present device is also capable of being used for measuring the dew point of gases. The indications received are positive and definite; and the present device maintains its calibration so that it may be used for a considerable period of time without necessity for repair or replacement of any of its parts. The present device is simple in construction and may be economically manufactured.

While we have illustrated a preferred embodiment of our invention, many modifications may be made without departing from the spirit of the invention, and we do not wish to be limited to the precise details of construction set forth, but desire to avail ourselves of all changes within the scope of the appended claims.

Having thus described our invention, what we claim as new and desire to secure by Letters Patent of the United States, is:

1. The method of measuring quantitatively the amount of gas in a mixture which comprises subjecting the gas to an electrostatic field between two electrodes and ionizing the gas between the electrodes by means of a member bearing radium, and comparing the current flow with a previously established standard for the gas in question.

2. The method of measuring quantitatively the amount of gas in a mixture which comprises subjecting the gas to an electrostatic field between two electrodes and ionizing the gas between the electrodes by means of a member bearing radium, and comparing the current flow with a previously established standard for the gas in question, the said comparison being accomplished by balancing the current conditions between said electrodes with the current conditions between a pair of electrodes of a standard cell containing the gas to be measured.

3. The method of measuring quantitatively the amount of gas in a mixture which comprises subjecting the gas to an electrostatic field between two electrodes and ionizing the gas between the electrodes by means of a member bearing radium, and comparing the current flow with a previously established standard for the gas in question, and adjusting the amount of ionization of the gas between said electrodes by adjusting the position of the radium bearing member relative to said electrodes.

4. The method of measuring quantitatively the amount of gas in a mixture which comprises subjecting the gas to an electrostatic field between two electrodes and ionizing the gas between the electrodes by means of a member bearing radium, and comparing the current flow with a previously established standard for the gas in question, and adjusting the amount of ionization of the gas between said electrodes by adjusting the position of the radium bearing member relative to said electrodes, and making a linear measurement of the amount of adjustment of the radium bearing member.

5. An apparatus for measuring quantitatively the amount of gas in a mixture, comprising a housing for containing the gas mixture to be measured, a pair of electrodes projecting into said housing in opposed relation and insulated from each other, and a radium supporting member arranged in proximity to both electrodes and the gas between them, a predetermined amount of radium on said member, the said radium producing an ionization of the gas between said electrodes which depends upon the position of the radium bearing member, and the amount of ionization determining the current conditions between said electrodes to enable a comparison with another standard cell containing the gas to be measured, the said radium bearing member having a threaded bore and being movably mounted upon guides, and threaded means in said bore and carried by said housing for adjusting the position of the radium bearing member.

6. An apparatus for measuring quantitatively the amount of gas in a mixture, comprising a housing for containing the gas mixture to be measured, a pair of electrodes projecting into said housing in opposed relation and insulated from each other, and a radium supporting member arranged in proximity to both electrodes and the gas between them, a predetermined amount of radium on said member, the said radium producing an ionization of the gas between said electrodes which depends upon the position of the radium bearing member, and the amount of ionization determining the current conditions between said electrodes to enable a comparison with another standard cell containing the gas to be measured, the said radium bearing member having a threaded bore and being movably mounted upon guides, and threaded means in said bore and carried by said housing for adjusting the position of the radium bearing member, the said electrodes each being supported by a threaded member mounted in the wall of said housing for adjustment toward and from each other.

7. An apparatus for measuring quantitatively the amount of gas in a mixture, comprising a housing for containing the gas mixture to be measured, a pair of electrodes projecting into said housing in opposed relation and insulated from each other, and a radium supporting member arranged in proximity to both electrodes and the gas between them, a predetermined amount of radium on said member, the said radium producing an ionization of the gas between said electrodes which depends upon the position of the radium bearing member, and the amount of ionization determining the current conditions between said electrodes to enable a comparison with another standard cell containing the gas to be measured, the said radium bearing member having a threaded bore and being movably mounted upon guides, and threaded means in said bore and carried by said housing for adjusting the position of the radium bearing member, the said housing being provided with a gas inlet and a gas outlet so that the gas mixture to be measured may be introduced in a stable condition by passing it through the housing until all other gases have been driven out before measurement is made.

8. An apparatus for measuring quantitatively the amount of gas in a mixture, comprising a housing for containing the gas mixture to be measured, a pair of electrodes projecting into said housing in opposed relation and insulated from each other, and a radium supporting member arranged in proximity to both electrodes and the gas between them, a predetermined amount of radium on said member, the said radium producing an ionization of the gas between said electrodes which depends upon the position of the radium bearing member, and the amount of ionization determining the current conditions between said electrodes to enable a comparison with another standard cell containing the gas to be measured, the said radium bearing member having a threaded bore and being movably mounted upon guides, and threaded means in said bore and carried by said housing for adjusting the position of the radium bearing member, the said radium bearing member comprising a nickel disc having a surface covered with gold foil supporting a radioactive material.

9. An apparatus for measuring quantitatively the amount of gas in a mixture, comprising a housing for containing the gas mixture to be measured, a pair of electrodes projecting into said housing in opposed relation and insulated from each other, and a radium supporting member arranged in proximity to both electrodes and the gas between them, a predetermined amount of radium on said member, the said radium producing an ionization of the gas between said electrodes which depends upon the position of the radium bearing member, and the amount of ionization determining the current conditions between said electrodes to enable a comparison with another standard cell containing the gas to be measured, the said radium bearing member having a threaded bore and being movably mounted upon guides, and threaded means in said bore and carried by said housing for adjusting the position of the radium bearing member, the said threaded member comprising an elongated shaft passing out of said housing through a gas-tight cell and provided with a calibrated knob having indicia at the end of the shaft.

10. An apparatus for measuring quantitatively the amount of gas in a mixture, comprising a housing for containing the gas mixture to be measured, a pair of electrodes projecting into said housing in opposed relation and insulated from each other, and a radium supporting member arranged in proximity to both electrodes and the gas between them, a predetermined amount of radium on said member, the said radium producing an ionization of the gas between said electrodes which depends upon the position of the radium bearing member, and the amount of ionization determining the current conditions between said electrodes to enable a comparison with another standard cell containing the gas to be measured, the said radium bearing member having a threaded bore and being movably mounted upon guides, and threaded means in said bore and carried by said housing for adjusting the position of the radium bearing member, the said threaded member comprising an elongated shaft passing out of said housing through a gas-tight cell and provided with a calibrated knob having indicia at the end of the shaft, and the said housing including a pointer extending parallel to the shaft for coperation with indicia on the knob, the said pointer having scale indicia and cooperating with a threaded follower on the shaft for indicating coarser adjustments of the radium bearing member.

11. In an apparatus for quantitatively measuring a gaseous condition, the combination of a pair of housing members, one of which comprises a standard cell containing a standard gas and the other of which comprises a test cell containing the gas, the condition of which is to be measured, each of said housings being provided with a pair of opposed electrodes energized in each case with an electromotive force, a member located in each housing supporting a radioactive material in proximity to the gas between the electrodes in each housing, the radioactive material ionizing the gas between each pair of electrodes and enabling a comparison to be made between the gases in the two housings.

12. In an apparatus for quantitatively measuring a gaseous condition, the combination of a pair of housing members, one of which comprises a standard cell containing a standard gas and the other of which comprises a test cell containing the gas, the condition of which is to be measured, each of said housings being provided with a pair of opposed electrodes energized in each case with an electromotive force, a member located in each housing supporting a radioactive material in proximity to the gas between the electrodes in each housing, the radioactive material ionizing the gas between each pair of electrodes and enabling a comparison to be made between the gases in the two housings, and an energizing transformer having the terminals of its secondary connected to similar electrodes of the two housings, the other electrodes of the two housings being connected through a resistance to the midpoint of said secondary.

13. In an apparatus for quantitatively measuring a gaseous condition, the combination of a pair of housing members, one of which comprises a standard cell containing a standard gas and the other of which comprises a test cell containing the gas, the condition of which is to be measured, each of said housings being provided with a pair of opposed electrodes energized in each case with an electromotive force, a member located in each housing supporting a radioactive material in proximity to the gas between the electrodes in each housing, the radioactive material ionizing the gas between each pair of electrodes and enabling a comparison to be made between the gases in the two housings, and an energizing transformer having the terminals of its secondary connected to similar electrodes of the two housings, the other electrodes of the two housings being connected through a resistance to the midpoint of said secondary, and an amplifier for amplifying a signal impressed upon said resistance when the conditions in the two housings are unbalanced.

14. In an apparatus for quantitatively measuring a gaseous condition, the combination of a pair of housing members, one of which comprises a standard cell containing a standard gas and the other of which comprises a test cell containing the gas, the condition of which is to be measured, each of said housings being provided with a pair of opposed electrodes energized in each case with an electromotive force, a member located in each housing supporting a radioactive material in proximity to the gas between the electrodes in each housing, the radioactive material ionizing the gas between each pair of electrodes and enabling a comparison to be made between the gases in the two housings, and an energizing transformer having the terminals of its secondary connected to similar electrodes of the two housings, the other electrodes of the two housings being connected through a resistance to the midpoint of said secondary, and an amplifier for amplifying a signal impressed upon said resistance when the conditions in the two housings are unbalanced, and an oscilloscope connected to the output of said amplifier for indicating the wave form of the signal under balanced or unbalanced conditions.

15. In an apparatus for quantitatively measuring a gaseous condition, the combination of a pair of housing members, one of which comprises a standard cell containing a standard gas and the other of which comprises a test cell containing the gas, the condition of which is to be measured, each of said housings being provided with a pair of opposed electrodes energized in each case with an electromotive force, a member located in each housing supporting a radioactive material in proximity to the gas between the electrodes in each housing, the radioactive material ionizing the gas between each pair of electrodes and enabling a comparison to be made between the gases in the two housings, and an energizing transformer having the terminals of its secondary connected to similar electrodes of the two housings, the other electrodes of the two housings being connected through a resistance to the midpoint of said secondary, and an amplifier for amplifying a signal impressed upon said resistance when the conditions in the two housings are unbalanced, and an oscilloscope connected to the output of said amplifier for indicating the wave form of the signal under balanced or unbalanced conditions, the said radioactive material being mounted for adjustment upon an indicating member for indicating the state of balance or the amount of unbalance of the conditions in said housings, said indicating member being calibrated to indicate the amount of gas in the mixture.

16. In a device for measuring concentration of gases, the combination of a standard gas chamber and a test gas chamber, each chamber being provided with a pair of spaced electrodes located in the standard gas and test gas chambers, respectively, means for impressing an electromotive force upon the electrodes of both chambers, means for balancing the current transmitting conditions between the electrodes of one chamber against that of the other chamber and calibrated means for indicating the amount of concentration of the gas in the test chamber.

17. In a device for measuring concentration of gases, the combination of a standard gas chamber and a test gas chamber, each chamber being provided with a pair of spaced electrodes located in the standard gas and test gas chambers, respectively, means for impressing an electromotive force upon the electrodes of both chambers, means for balancing the current transmitting conditions between the electrodes of one chamber against that of the other chamber and calibrated means for indicating the amount of concentration of the gas in the test chamber, the said electromotive force comprising a square wave alternating current and said device including an A. C. amplifier for amplifying a signal caused by a condition of unbalance, and means connected to the output of said amplifier for indicating a condition of balance or unbalance.

18. In a device for measuring concentration of gases, the combination of a standard gas chamber and a test gas chamber, each chamber being provided with a pair of spaced electrodes located in the standard gas and test gas chambers, respectively, means for impressing an electromotive force upon the electrodes of both chambers, means for balancing the current transmitting conditions between the electrodes of one chamber against that of the other chamber and calibrated means for indicating the amount of concentration of the gas in the test chamber, said electromotive force being supplied by batteries and said device including a D. C. amplifier for amplifying a signal resulting from unbalanced conditions, and a D. C. indicating device for indicating the amount of unbalance or a condition of balance.

19. In a device for measuring concentration of gases, the combination of a standard gas chamber and a test gas chamber, each chamber being provided with a pair of spaced electrodes located in the standard gas and test gas chambers, respectively, means for impressing an electromotive force upon the electrodes of both chambers, means for balancing the current transmitting conditions between the electrodes of one chamber against that of the other chamber and calibrated means for indicating the amount of concentration of the gas in the test chamber, a D. C. converter connected to said circuit between electrodes of the two gas chambers to be controlled by a signal resulting from a condition of unbalance, and a two-phase motor controlled by said signal and mechanically connected to a potentiometer for bringing the circuit back to a condition of balance, said two-phase motor also driving a recorder system.

20. In a device for measuring concentration of gases, the combination of a standard gas chamber and a test gas chamber, each chamber being provided with a pair of spaced electrodes located in the standard gas and test gas chambers, respectively, means for impressing an electromotive force upon the electrodes of both chambers, means for balancing the current transmitting conditions between the electrodes of one chamber against that of the other chamber and calibrated means for indicating the amount of concentration of the gas in the test chamber, and means for adjusting the condition of balance comprising a potentiometer for the electrodes of each chamber, voltage measuring means for indicating the voltage impressed upon the electrodes of each chamber, said voltage measuring means being calibrated to indicate the amount of concentration of gas in the test chamber.

21. In a device for measuring concentration of gases, the combination of a standard gas chamber and a test gas chamber, each chamber being provided with a pair of spaced electrodes located in the standard gas and test gas chambers, respectively, means for impressing an electromotive force upon the electrodes of both chambers, means for balancing the current transmitting conditions between the electrodes of one chamber against that of the other chamber and calibrated means for indicating the amount of concentration of the gas in the test chamber, and means for adjusting the condition of balance comprising a potentiometer for the electrodes of each chamber, voltage measuring means for indicating the voltage impressed upon the electrodes of each chamber, said voltage measuring means being calibrated to indicate the amount of concentration of gas in the test chamber, said electromotive force comprising a square wave alternating current, an A. C. amplifier connected to the circuit to amplify signals produced by a condition of unbalance and means energized from said amplifier for indicating a condition of balance or unbalance.

22. An apparatus for measuring quantitatively the amount of gas in a mixture, comprising a housing for containing the gas mixture to be measured, a second housing for containing a standard cell containing the same gas which is to be measured in the mixture, a pair of electrodes projecting into each housing in opposed relation and insulated from each other, a radium supporting member in each housing arranged in proximity to both electrodes and to the gas between them, a predetermined amount of radium on each of said members, said radium producing an ionization of the gas between said electrodes, which depends upon the position of the radium bearing member, and the amount of ionization determining the current conditions between the electrodes of the first-mentioned housing in comparison with the current conditions between the electrodes of the second-mentioned housing, for measuring the amount of gas in the mixture.

23. The method of quantitatively measuring the amount of a certain gas in a mixture of gases, which comprises passing the gas mixture through a container having a pair of insulated electrodes therein, ionizing the gas between said electrodes with a radium bearing member arranged in proximity to both electrodes, impressing an electromotive force on said electrodes, and balancing the resulting current against a signal current of known value equivalent to that passed by a standard cell containing said certain gas, by adjusting the position of the radium bearing member to vary the amount of ionization of the gas between said electrodes to vary the current passed, and comparing the position of the radium bearing member with a scale calibrated in percentage of said certain gas in the mixture.

24. An apparatus for measuring quantitatively the amount of a certain gas in a mixture, comprising a test gas housing for containing or passing the gas to be measured, a second standard gas housing containing a standard gas, each of said housings having a pair of insulated electrodes projecting into the housing, each housing having a radium supporting member insulated from said electrodes but located adjacent both electrodes to ionize the gas between said electrodes in each housing, means for applying equal differences of potential to the electrodes of each housing, said means causing an ionization current flow between the electrodes in each housing, said equal potential differences producing a current flow in the test gas housing which is proportional to the quantity of said certain gas in the mixture in said test housing, and adjustable means having a pointer and a scale calibrated in terms of the quantity of said certain gas in said mixture for adjusting the current flow to be equal in both housings and for indicating the amount of gas in the mixture.

25. Apparatus for analyzing a gaseous medium, comprising two substantially identical ion chambers each having two electrodes, first and second inlet conduit means for supplying a gas of known composition to one of said chambers and a gas of unknown composition to the other chamber respectively, first and second outlet conduit means for exhausting the gases from said first and second chambers to a common low pressure zone, the throughput capacity of said outlet means being sufficient to maintain said chambers substantially at the pressure of said low pressure zone, circuit means for applying substantially equal constant potentials between the electrodes in each chamber, radioactive source means for subjecting said chambers to an ionizing radiation, and electrical circuit means connected to one of the electrodes of each of said chambers for comparing the ionization currents delivered by said electrodes under the effect of said radiation.

26. Apparatus for analyzing a gaseous medium, comprising two substantially identical ion chambers each having two electrodes, first and second inlet conduit means for supplying a gas of known composition to one of said chambers and a gas of unknown composition to the other chamber respectively, first and second outlet conduit means for exhausting the gases from said first and second chambers to a common low pressure zone, the said low pressure zone being atmosphere, and the said outlet conduit means being open for free exhaust to atmospheric pressure, circuit means for applying substantially equal constant potentials between the electrodes in each chamber, radioactive source means for subjecting said chambers to an ionizing radiation, and electrical circuit means connected to one of the electrodes of each of said chambers for comparing the ionization currents delivered by said electrodes under the effect of said radiation.

References Cited in the file of this patent

UNITED STATES PATENTS

| | | |
|---|---|---|
| 2,154,292 | Taliaferro | Apr. 11, 1939 |
| 2,155,419 | Gunn | Apr. 25, 1939 |
| 2,497,213 | Downing | Feb. 14, 1950 |
| 2,513,818 | Roop | July 4, 1950 |
| 2,540,399 | Linkroum et al. | Feb. 6, 1951 |
| 2,595,550 | Simpson | May 6, 1952 |
| 2,641,710 | Pompeo et al. | June 9, 1953 |